United States Patent Office 3,165,508
Patented Jan. 12, 1965

3,165,508
DEGRADED STARCH POLYOXYALKYLENE ETHER COMPOSITIONS AND PROCESS FOR PRODUCING THE SAME
Felix H. Otey and Charles L. Mehltretter, Peoria, Ill., assignors to the United States of America as represented by the Secretary of Agriculture
No Drawing. Filed Apr. 13, 1962, Ser. No. 187,443
10 Claims. (Cl. 260—210)
(Granted under Title 35, U.S. Code (1952), sec. 266)

A nonexclusive, irrevocable, royalty-free license in the invention herein described, throughout the world for all purposes of the United States Government, with the power to grant sublicenses for such purposes, is hereby granted to the Government of the United States of America.

This application is a continuation-in-part of application Serial No. 176,155, filed February 27, 1962, now abandoned.

This invention relates to polyurethane foams which are obtained by reacting an organic polyisocyanate with degarded starch glycoside polyoxyalkylene ethers.

It is an object of the present invention to provide novel polyurethane foams having improved resistance to yellowing. So far as is known, practically all industrial polyurethane foams yellow shortly after production and are sometimes color coated to by-pass this objectionable property. Although we have no explanation for the fact that the urethane foams of this invention resist yellowing for long periods of time, this characteristic is of practical significane. Another object of the invention is to provide an improved process for the production of polyurethane foams. A further object of this invention is to provide polyurethane foams which may be produced with equipment now in use for such foam manufacture. Still another object of the present invention is to provide novel polyhydroxy compositions which are particularly suitable for reaction with organic polyisocyanates in the production of polyurethane foams and which are prepared by a simple procedure from the cheap raw materials, starch, polyols, and alkylene oxides.

The above objects and others are accomplished by providing improved polyurethane foams which are obtained by reacting an organic polyisocyanate, a degraded starch glycoside polyoxyalkylene ether composition having reactive hydroxyl groups and water.

In accordance with this invention the degraded starch glycoside polyoxyalkylene ether compositions used for reaction with organic diisocyanates are prepared by reacting unmodified starch with polyols such as ethylene glycol, propylene glycol or glycerol under specific temperature conditions in the presence of a strong mineral acid catalyst such as sulfuric acid, hydrogen chloride or phosphoric acid or an aryl sulfonic acid, followed by etherification with 1,2-alkylene oxide selected from the group of ethylene oxide, propylene oxide or mixtures thereof to produce polyethers having reactive hydroxyl groups. Either acid or alkaline catalysts may be used in the etherification reaction. The preferred alkaline catalysts comprise essentially anhydrous sodium hydroxide, sodium bicarbonate and sodium methylate.

The invention is applicable to all granular starches and is meant to include, corn, wheat, potato, tapioca, waxy maize, sorghum, amylose, high amylose starch and starches isolated by fractionation of wheat flour by fine grinding and air classification. It is also meant to include flours such as wheat flour and corn flour which contain high percentages of granular starch.

The reaction of the degraded starch glycoside polyoxyethylene ethers with organic polyisocyanate is not limited to tolylene diisocyanate (i.e. 80 percent of 2,4- and 20 percent of 2,6-toluene diisocyanate) according to the invention. Numerous other organic polyisocyanates are available such as ethylene diisocyanate, 1,5-naphthalene diisocyanate, etc. which may be used. However it is preferred to use tolylene diisocyanate because of its lower cost and favorable properties.

More specifically we have discovered that the polyether compositions of the invention used for reaction with organic diisocyanate to produce polyurethane foams are produced by heating granular starch with one to two mole equivalents of ethylene glycol, propylene glycol or glycerol at a temperature of about 120 to about 140° C. in the presence of 0.1 to 1.5 percent of concentrated sulfuric acid or hydrogen chloride, so that the reaction mixture passes rapidly into the gel state and then quickly becomes a fluid that is essentially nonreducing to Fehling's solution. The fluid reaction mixture is further heated in the above temperature range at reduced pressure for about 30 minutes to one hour to remove water completely, and simultaneously at least partially remove other volatile components including unreacted polyol. The degraded starch glycoside mixture is then made alkaline by addition of powdered sodium hydroxide and treated with ethylene oxide, propylene oxide or mixtures thereof at about 130° to about 180° C. until a minimum of 4 mole equivalents have reacted. A quantitative yield of degraded starch glycoside polyoxyalkylene ether composition is obtained. Degradation of starch under gelatinizing conditions by the method of the invention, i.e., transglycosidation at about 120° to about 140° C. for about 15 minutes to about 2 hours, produces a mixture of glycosides of relatively low molecular weights which glycoside mixture is reacted with alkylene oxide to produce the polyoxyalkylene ether composition of our invention. A high degree of molecular degradation of starch is achieved since the glycoside mixture obtained is extremely soluble in water and in methanol and gives no indication of the presence of amylaceous matter. The degraded starch glycoside polyoxyalkylene ether compositions are anhydrous viscous liquids, decolorizable to a light color in the ordinary manner by treatment with activated carbon or bleaching or a combination of the two.

The polyoxyethylene ether products have a wide range of molecular weights and viscosities and hydroxyl numbers of about 75 to about 600 and are thus suitable by reaction with organic polyisocyanates and water for the prepartion of a variety of flexible to rigid polyurethane foams. Other methods may be used for foaming our polyether products such as by reaction with organic polyisocyanates under essentially dry conditions using gaseous or gas-producing agents such as trichloromonofluoromethane.

The following nonlimiting examples are presented to illustrate the practice of our invention.

EXAMPLE 1

Into a 500 cc. three-neck round-bottom flask equipped with a ground glass stirrer, thermometer, nitrogen gas inlet tube and a Dean-Stark condenser is placed 60 cc. of glycerol containing 0.4 gram of concentrated sulfuric acid. To this stirred solution is added 32.4 grams (0.2 mole) of dry corn starch and the suspension heated to 130° C. The mixture soon becomes a liquid of light yellow color which darkens somewhat after 30 minutes at this temperature, and shows essentially no reducing action toward Fehling's solution. Water pump vacuum is applied for an additional 30 minutes at this temperature and the product is further concentrated under high vacuum to produce a viscous liquid which weighs 47 grams. This yield indicates that 15.6 grams (0.17 mole) of glycerol has reacted. After addition of sufficient sodium hydroxide to make the reaction mixture alkaline the degraded starch glycoside mixture is stirred in a nitrogen atmosphere and ethylene oxide introduced. A total of 7 moles of ethylene oxide per mole of starch is reacted in 4 hours at 170° C. The viscous polyether is bleached to a very light straw color with hydrogen peroxide. Its hydroxyl number is 557.

Seven grams of the degraded starch glycoside polyether is mixed in a small beaker with 7 grams of tolylene diisocyanate and heated on a steam bath for about two minutes. Then 0.4 gram of a commercial nonionic polyoxyethylated vegetable oil emulsifier is stirred with the mixture to form a uniform suspension. Four drops of water containing a catalytic amount of triethylenediamine are then added slowly with stirring. After stirring for 30 seconds the reaction mixture is poured into a waxed beaker to foam at room temperature. Contrary to polyurethane foams prepared with a conventional polyol starting material, this white foam shows no tendency to yellow on aging for 5 months.

EXAMPLE 2

Into a 250 cc. three-neck, round-bottom flask, equipped with a nitrogen sparge tube, stirrer, thermometer and outlet tube is placed 48.6 grams (0.3 mole) of dry corn starch; then 18.6 grams (0.3 mole) of ethylene glycol is added dropwise with stirring. A catalytic amount of sulfuric acid (4 drops) is added and the resulting mixture is heated to 130° C. at which temperature a liquid forms. The product is then stirred, in a nitrogen atmosphere, for 30 minutes at 120° to 130° C. after which the nitrogen inlet tube is replaced with one delivering ethylene oxide. In 5 hours at 140° C., 7.2 moles of ethylene oxide per mole of starch is reacted. Because of the observed markedly reduced rate of etherification after about 7 moles of ethylene oxide is reacted, a small amount of solid sodium hydroxide catalyst is added to produce alkalinity and to greatly increase the rate of uptake of ethylene oxide. An additional 7 moles of ethylene oxide per mole of starch is reacted in 1.5 hours more at about 170° C. The resulting polyoxyethylene ether after partial decolorization has a hydroxyl number of 269; Brookfield viscosity at 25° C. is 2,160 centipoises; Gardner color is 14.

Using the procedure of Example 1 a semi-rigid white polyurethane foam is prepared by reaction with tolylene diisocyanate and water.

EXAMPLE 3

Into the same equipment described in Example 1 is placed 48.6 grams (0.3 mole) of dry corn starch, then 18.6 grams (0.3 mole) of ethylene glycol is added dropwise with stirring. Four drops of concentrated sulfuric acid is used and the resulting mixture is heated to 130° C. to form a homogeneous liquid. The liquid material is then stirred in a nitrogen atmosphere for 30 minutes at 120° to 130° C., after which ethylene oxide gas is introduced to the flask. Seven moles of ethylene oxide per mole of starch reacts in about 5 hours at 140° C. The viscous polyether product is then bleached or partially decolorized with activated carbon to a much lighter color.

A white rigid polyurethane foam is prepared as in Example 1, using this polyoxyethylated degraded starch glycoside.

EXAMPLE 4

Into the same equipment as described for Example 1 is placed 32.4 grams (0.2 mole) of dry corn starch and 50 cc. propylene glycol. Then 5 cc. of concentrated hydrochloric acid is added with stirring. The mixture is heated with stirring at 130° C. and forms an essentially clear paste after 12 minutes at this temperature. After one hour at 130° C. a water vacuum is applied and the temperature lowered to 100° C. and kept under vacuum for 2.5 hours. The liquid is neutralized with a small amount of granular sodium bicarbonate and then concentrated with an oil pump until no more of the glycol distills at 120° C. The yield of liquid product indicates that 0.1 to 0.15 mole of propylene glycol reacts. The product is essentially nonreducing to Fehling's solution. After the addition of solid sodium hydroxide to alkalinity, nitrogen is introduced to the flask to obtain an oxygen-free atmosphere and the liquid heated with stirring at 130° C. for 30 minutes. Ethylene oxide gas is then introduced to the liquid at 170° C. for about 4 hours and the weight increase indicates that 6 moles of this reagent reacts per mole of starch. The resulting viscous polyoxyethylene ether is easily decolorized to a light color for polyurethane foam preparation.

The white rigid polyurethane foam was prepared by the procedure described in Example 1 and had good physical properties.

EXAMPLE 5

Into a 1-liter three-necked round-bottom flask equipped with a nitrogen sparge tube, stirrer, thermometer and outlet tube is placed 240 cc. of ethylene glycol containing 0.9 gram of concentrated sulfuric acid. To this solution is added 200 grams (1.1 mole) of air dried corn starch containing 11.3 percent moisture and the mixture heated with stirring to 130° C. The mixture becomes a gel at about 130° C. but becomes easy to stir soon after the temperature reaches 130° C. The reaction mixture is kept at 130° C. for about 30 minutes after which a water vacuum is applied at 120° C. for 15 minutes and the liquid glycoside mixture then neutralized with 1.57 grams of granular sodium bicarbonate. The mixture is concentrated with an oil pump until no more ethylene glycol distills at 130° C. 54.8 grams of product is obtained which indicates that 0.8 mole ethylene glycol has reacted per mole of starch. The product, which is essentially nonreducing to Fehling's solution, is then heated to 165° C., treated with 0.2 gram of solid sodium hydroxide catalyst, the air displaced with nitrogen, and ethylene oxide introduced for polyether formation. The temperature is increased to 180° C., at which temperature the rate of ethylene oxide uptake is rapid. As the reaction progresses, the reaction rate increases to such an extent that it is necessary to gradually decrease the temperature. 337 grams or 7 moles of ethylene oxide per mole of starch reacts in about 7 hours of reaction, the final temperature being 145° C. The product is dissolved in 1200 cc. of ethanol, neutralized with hydrogen chloride, and partially decolorized with carbon. The ethanol is then removed by vacuum distillation. Two additional runs were made by this procedure and the properties of these intermediate products for urethane foams are tabulated in Table I.

*Table I*

| Run | Moles of ethylene oxide reacted per mole of starch | Brookfield viscosity at 25° C., cps. | Gardner color | Hydroxyl number |
|---|---|---|---|---|
| 1 | 7 | 14,460 | 11 | 519 |
| 2 | 6.7 | 13,400 | 13 | 538 |

A white rigid polyurethane foam is prepared as in Example 1, using the polyoxyethylenated degraded starch glycoside of Table I, run 1. The foam produced by this method has a density of 2.72 lbs./cu. ft. and has good physical properties.

EXAMPLE 6

Seven grams of a propylene oxide adduct of degraded corn starch glycoside prepared with propylene glycol having a hydroxyl number of about 400 is mixed in a beaker with 7 grams of tolylene diisocyanate and heated on a steam bath for about two minutes. 0.4 gram of a non-ionic polyoxyethylated vegetable oil emulsifier is stirred with the mixture to form a uniform dispersion. Four drops of water containing a catalytic amount of triethylene diamine are added slowly with agitation. After stirring for 30 second the reaction mixture is poured into a waxed beaker to foam at room temperature. A rigid white foam with good physical properties is obtained.

EXAMPLE 7

Fifteen grams of an ethylene oxide-propylene oxide adduct of degraded corn starch glycoside prepared with ethylene glycol having a hydroxyl number of about 453 is mixed in a beaker with 4 grams of tolylene diisocyanate and heated on a steam bath for two minutes. 0.5 gram of polyoxyethylated vegetable oil emulsifier is mixed in followed by 0.2 gram of water containing a catalytic amount of triethylene diamine. After stirring for 30 seconds the reaction mixture is poured into a waxed beaker to foam at room temperature. The polyurethane rigid foam is white and has a density of about 2.7 lbs./cu. ft.

EXAMPLE 8

A portion of the polyoxyethylene degrated starch glycoside ether of run 1 of Example 5 is reacted with additional ethylene oxide (to a total of 74 mole equivalents of ethylene oxide) to obtain a product having a hydroxyl number of 77. A polyurethane foam is prepared from this polyether in the following manner.

Fifteen grams of the highly etherified degraded cornstarch glycol glycoside is mixed in a beaker with 4 grams of tolylene diisocyanate and heated on a steam bath for two minutes. Then 0.5 gram of polyoxyethylated vegetable oil is added followed by 0.2 gram of water containing a catalytic amount of triethylenediamine. After stirring for 30 seconds the reaction mixture is poured into a waxed beaker to foam at room temperature. The resulting foam having a density of about 3 lbs./cu. ft. is flexible and white.

EXAMPLE 9

Into the same equipment described in Example 1 is placed 48.6 grams (0.3 mole) of dry corn starch; then 18.6 grams (0.3 mole) of ethylene glycol is added in portions with stirring. Four drops of concentrated sulfuric acid is added and the resulting mixture heated to 130° C. to form a homogeneous liquid. The liquid material is made alkaline by the adidtion of sodium bicarbonate and stirred in a nitrogen atmosphere. Vaporized 1,2-propylene oxide is introduced to the flask at 170° C. until about 7 moles reacts per mole of starch originally used. The viscous polyether after treatment with activated carbon is reacted with tolylene diisocyanate under the conditions used in Example 1 to produce a white rigid foam having good physical properties.

EXAMPLE 10

Corn starch is reacted with ethylene glycol under the conditions used in Example 5. The product containing 0.8 mole of ethylene glycol per mole of starch is made alkaline by addition of solid sodium bicarbonate and then reacted with 4 moles of ethylene oxide per mole of starch at about 170° C. according to the technique of Example 5. After treatment with activated carbon the light colored very viscous product has a Brookfield viscosity of 95,000 centipoises at 25° C. It produces a white rigid polyurethane foam by reaction with tolylene diisocyanate according to the procedure described in Example 1.

EXAMPLE 11

Using the same equipment of Example 1, 100 grams of wheat starch (89 grams dry basis) is heated with 120 cc. of ethylene glycol containing 0.6 gm. of concentrated sulfuric acid at 130° C. for one hour. The yield of product after vacuum concentration as in Example 1 indicates the reaction of 0.76 mole of ethylene glycol per mole of starch. This product is then reacted in a nitrogen atmosphere with 1,2-propylene oxide at 170° C. after addition of solid sodium hydroxide catalyst to obtain alkaline conditions until a total of 7 moles of propylene oxide reacts per mole of starch. The viscous polyether after treatment with activated carbon is reacted with tolylene diisocyanate as in Example 1 to produce a white rigid foam having good physical properties.

EXAMPLE 12

Wheat starch is reacted with ethylene glycol and ethylene oxide under the conditions used for corn starch in Example 5. The viscous polyoxyethylated degraded starch glycoside which contains 7.1 moles of ethylene oxide per mole of starch has a Brookfield viscosity of 11,600 centipoises at 25° C. After decolorization a rigid polyurethane foam of superior whiteness is prepared from this light colored glycoside polyether by the procedure described in Example 1.

EXAMPLE 13

Tapioca starch is reacted with ethylene glycol and ethylene oxide under the conditions used for corn starch in Example 5. The intermediate glycoside contains 0.72 mole of glycol per mole of starch and the polyoxyethyleneated product contains 7.1 moles of ethylene oxide per mole of starch and has a Brookfield viscosity of 11,500 centipoises at 25° C. A white rigid polyurethane foam is prepared by reaction with tolylene diisocyanate by the procedure described in Example 1.

EXAMPLE 14

Red milo sorghum starch is reacted with 0.78 mole of ethylene glycol and 5.8 moles of ethylene oxide per mole of starch by the procedure of Example 5. The viscous product has a Brookfield viscosity of 20,000 centipoises at 25° C. A rigid white polyurethane foam is prepared from this polyether according to the method of Example 1.

EXAMPLE 15

100 grams of wheat starch, which contains about 2 percent protein and which is produced by fine grinding and air classification of wheat flour, is stirred at 130° C. with 150 cc. of ethylene glycol containing 0.6 gram of concentrated sulfuric acid for about one hour. The liquid product, when neutralized and vacuum concentrated as described in Example 5, contains 0.9 mole of reacted ehylene glycol per mole of starch. This is treated with ethylene oxide at 170° C. after addition of excess powdered sodium bicarbonate for alkalinity, until 7.1 moles reacts per mole of starch. The viscous decolorized product has a Brookfield viscosity of 7,925 centipoises at 25° C. A white rigid polyurethane foam is prepared from this material according to the procedure of Example 1.

EXAMPLE 16

80 grams of air dried wheat flour (69 g. dry basis) is stirred in 150 cc. of ethylene glycol containing 1 gram of concentrated sulfuric acid at 130° C. for one hour. About 131 cc. of excess ethylene glycol is removed during vacuum concentration and the remaining product is treated with sufficient sodium bicarbonate to make it alkaline. Ethylene oxide is passed into the liquid product and reacted at about 170° C. until a Brookfield viscosity of 7,500 centipoises is obtained at 25° C.

Seven grams of this polyoxyethylene degraded starch glycoside is mixed with 7 grams of tolylene diisocyanate and 0.5 gram of polyoxyethyl vegetable oil emulsifier and heated with stirring to about 60° C. The mixture is then stirred for about 5 minutes until a clear solution is obtained, cooled in an ice bath and 7 drops of water which contains a catalytic amount of triethylene diamine added with stirring. The mixture is then poured into a waxed paper cup to foam at room temperature. It is allowed to cure at room temperature. The rigid polyurethane foam has a density of 3.4 lbs./cu. ft.

Having fully disclosed our invention, we claim:

1. A process for the production of a degraded starch polyoxyalkyline ether composition containing polyhydroxyl groups comprising heating unmodified granular starch with about from 1 to 2 mole equivalents, based on the starch, of a polyol selected from the group consisting of ethylene glycol, propylene glycol, and glycerol, in the presence of about from 0.1 percent to 1.5 percent, based on the polyol, of an acid catalyst selected from the group consisting of sulfuric acid, hydrochloric acid, phosphoric acid, and an aryl sulfonic acid, at a temperature of about from 120° C. to 140° C. for about from 30 minutes to one hour, and under non-hydrolytic conditions, to effect degradation and transglycosidation of the starch, heating the resulting degraded and transglycosidated starch mixture in the said temperature range for an additional 30 minutes to one hour at reduced pressure to remove any unreacted polyol from the mixture, adding a catalytic excess of alkali to the resulting anhydrous, degraded, and transglycosidated starch mixture to neutralize the acid and terminate the reaction prior to the formation of more than a trace of reducing sugars and to catalyze the subsequent etherification reaction, and, in the substantial absence of atmospheric oxygen, etherifying the degraded and transglycosidated starch mixture with an alkylene oxide selected from the group consisting of ethylene oxide, propylene oxide, and mixtures thereof, at a temperature of about from 130° C. to 180° C. until about from 4 to 7 mole equivalents of the alkylene oxide have reacted to produce a degraded and transglycosidated starch polyoxyalkylene ether composition having an average hydroxyl number of about from 75 to 600.

2. The process of claim 1 wherein the polyol is ethylene glycol.

3. The process of claim 1 wherein the polyol is propylene glycol.

4. The process of claim 1 wherein the polyol is glycerol.

5. The process of claim 1 wherein the alkylene oxide is ethylene oxide.

6. The process of claim 1 wherein the alkylene oxide is propylene oxide.

7. The process of claim 1 wherein the acid catalyst is sulfuric acid.

8. A process for the production of a degraded and transglycosidated starch mixture comprising heating unmodified granular starch with about from 1 to 2 mole equivalents, based on the starch, of a polyol selected from the group consisting of ethylene glycol, propylene glycol, and glycerol, in the presence of about from 0.1 percent to 1.5 percent, based on the polyol, of an acid catalyst selected from the group consisting of sulfuric acid, hydrochloric acid, phosphoric acid, and an aryl sulfonic acid, at a temperature of about from 120° C. to 140° C. for about from 30 minutes to one hour, and under non-hydrolytic conditions, to effect degradation and transglycosidation of the starch, heating the resulting degraded and transglycosidated starch mixture in the said temperature range for an additional 30 minutes to one hour at reduced pressure to remove any unreacted polyol from the mixture, and neutralizing the acid to terminate the reaction prior to the formation of more than a trace of reducing sugars.

9. The product produced by the process of claim 1.

10. The product produced by the process of claim 8.

References Cited by the Examiner
UNITED STATES PATENTS

| | | | |
|---|---|---|---|
| 2,390,507 | 12/45 | Cantor | 260—210 |
| 2,407,002 | 9/46 | Griffin | 260—210 |
| 3,073,788 | 1/63 | Hostettler et al. | 260—2.5 |

LEWIS GOTTS, *Primary Examiner.*

L. J. BERCOVITZ, *Examiner.*